United States Patent
Kulkarni et al.

(10) Patent No.: US 9,758,712 B2
(45) Date of Patent: Sep. 12, 2017

(54) METHODS OF DESIGNING AN INVERT EMULSION FLUID HAVING HIGH ASSOCIATIVE STABILITY

(71) Applicant: Halliburton Energy Services, Inc., Houston, TX (US)

(72) Inventors: Sandeep D. Kulkarni, Kingwood, TX (US); Kushabhau D. Teke, Pune (IN); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 14/906,301

(22) PCT Filed: Oct. 30, 2013

(86) PCT No.: PCT/US2013/067433
§ 371 (c)(1),
(2) Date: Jan. 20, 2016

(87) PCT Pub. No.: WO2015/065358
PCT Pub. Date: May 7, 2015

(65) Prior Publication Data
US 2016/0168444 A1    Jun. 16, 2016

(51) Int. Cl.
*C09K 8/36* (2006.01)
*C09K 8/502* (2006.01)
(Continued)

(52) U.S. Cl.
CPC ............... *C09K 8/36* (2013.01); *C09K 8/502* (2013.01); *C09K 8/528* (2013.01); *C09K 8/565* (2013.01);
(Continued)

(58) Field of Classification Search
None
See application file for complete search history.

(56) References Cited

U.S. PATENT DOCUMENTS

| 4,575,428 A * | 3/1986 | Clapper | ............ C09K 8/36 507/131 |
| 2003/0084717 A1 | 5/2003 | Herzhaft et al. | |

(Continued)

FOREIGN PATENT DOCUMENTS

| EP | 0929619 A1 | 7/1999 |
| WO | 9805735 A1 | 2/1998 |
| WO | 2013116920 A1 | 8/2013 |

(Continued)

OTHER PUBLICATIONS

International Search Report and Written Opinion for PCT/US2013/067433 dated Jul. 28, 2014.

(Continued)

*Primary Examiner* — Jeffrey Washville
(74) *Attorney, Agent, or Firm* — McDermott Will & Emery LLP

(57) ABSTRACT

Some embodiments described herein relate to methods comprising providing a proposed invert emulsion formulation, wherein the proposed invert emulsion formulation comprises an oil phase, an aqueous phase, and a particulates fraction comprising a first sub-fraction and a second sub-fraction, wherein the first sub-fraction comprises high-gravity particulates and the second sub-fraction comprises low-gravity particulates; calculating an initial associative stability value of the proposed invert emulsion based on the degree of association between the aqueous phase and the particulates fraction comprising both the first sub-fraction and the second sub-fraction; manipulating the proposed invert emulsion based on the initial associative stability value so as to produce an associatively stable invert emulsion having a final associative stability value in the range of between about 50% and about 100%; and introducing the associatively stable invert emulsion into a subterranean formation.

9 Claims, 1 Drawing Sheet

(51) Int. Cl.
  *C09K 8/528* (2006.01)
  *C09K 8/565* (2006.01)
  *C09K 8/64* (2006.01)
  *C09K 8/74* (2006.01)
  *C09K 8/82* (2006.01)

(52) U.S. Cl.
  CPC .............. *C09K 8/64* (2013.01); *C09K 8/74* (2013.01); *C09K 8/82* (2013.01); *C09K 2208/12* (2013.01); *C09K 2208/24* (2013.01); *C09K 2208/26* (2013.01); *C09K 2208/28* (2013.01); *C09K 2208/32* (2013.01)

(56) References Cited

U.S. PATENT DOCUMENTS

| | | |
|---|---|---|
| 2013/0186197 A1 | 7/2013 | Jamison et al. |
| 2013/0192360 A1 | 8/2013 | Jamison et al. |

FOREIGN PATENT DOCUMENTS

| | | |
|---|---|---|
| WO | WO2014113144 A1 | 7/2014 |
| WO | WO2014164447 A1 | 10/2014 |
| WO | 2015065358 A1 | 5/2015 |

OTHER PUBLICATIONS

Recommended Practice for Field Testing of Oil-Based Drilling Fluids, AP Recommended Practice 13B-2, Fourth Ed., Mar. 2005.
Examination Report No. 1 received in corresponding Australian Application No. 2013404055, dated Sep. 8, 2016.

* cited by examiner

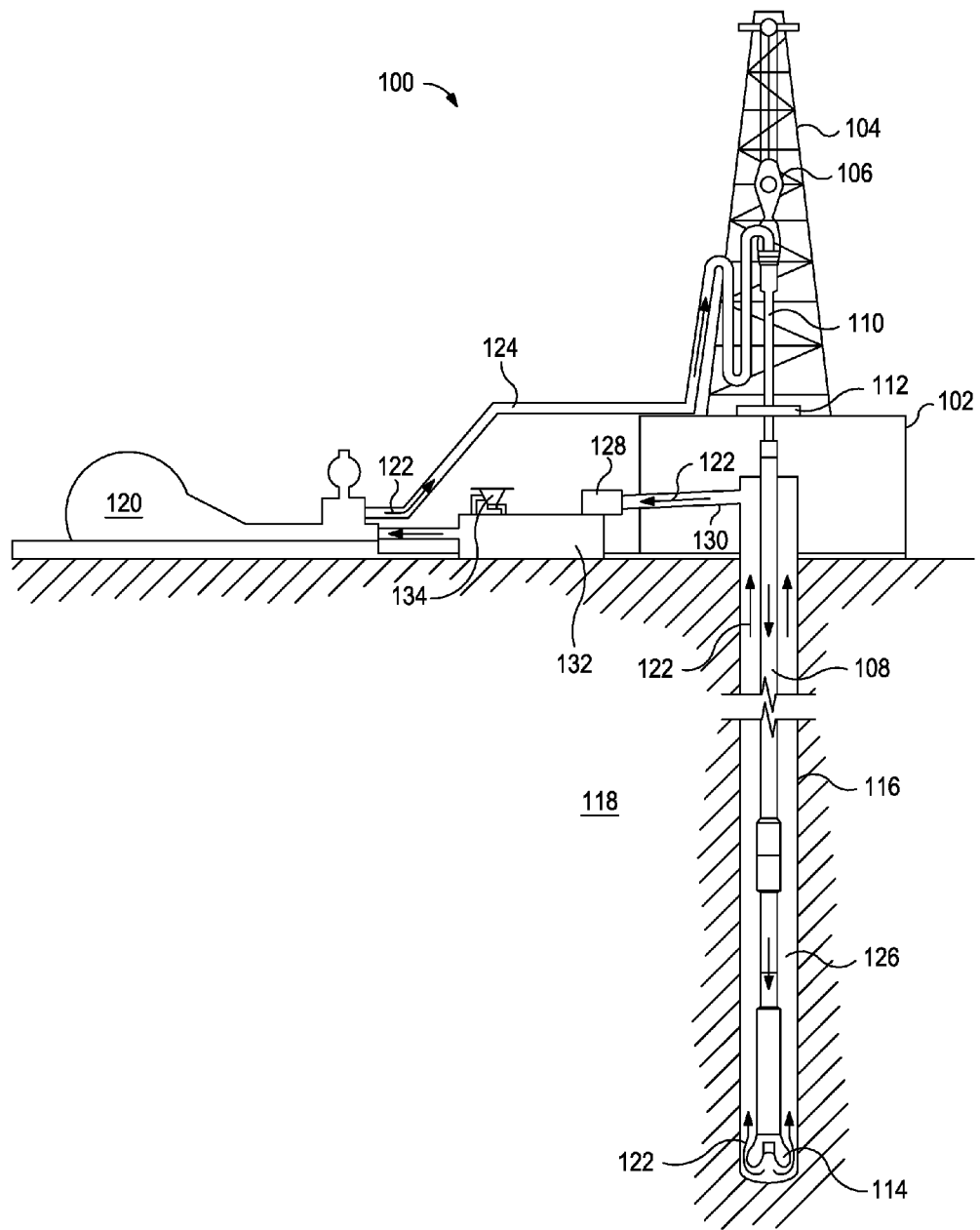

METHODS OF DESIGNING AN INVERT EMULSION FLUID HAVING HIGH ASSOCIATIVE STABILITY

BACKGROUND

The embodiments herein relate to methods of designing an invert emulsion fluid having high associative stability.

Hydrocarbon producing wells are typically formed by drilling a wellbore into a subterranean formation. A drilling fluid is circulated through a drill bit within the wellbore as the wellbore is being drilled. The drilling fluid is circulated back to the surface of the wellbore with drilling cuttings for removal from the wellbore. Such drilling fluids may be invert emulsions. An emulsion is a fluid including an internal phase of dispersed immiscible liquid droplets in an external, continuous liquid phase. An invert emulsion, also referred to as a water-in-oil emulsion, comprises an internal phase of water droplets and an external phase of oil. As used herein, the "water" in an invert emulsion refers to an aqueous base fluid and the "oil" refers to any non-polar organic liquid (e.g., petroleum, kerosene, synthetic oil, paraffin, mineral oil, and the like). Invert emulsions for use as drilling fluids may provide superior rheological, filtration, and oil-wetting characteristics. Additionally, invert emulsions may remain stable under extreme subterranean conditions, such as in the presence of high electrolyte concentrations, soluble gasses, high temperatures, and high pressures.

Invert emulsion drilling fluids often comprise particulates therein, referred to as a particulates fraction in the invert emulsion. These particulates may serve to, for example, increase the density of the drilling fluid (e.g., weighting agents, such as barite) to balance pressure and stabilize the wellbore. Other particulates may include corrosion inhibitors, flocculants, fluid loss agents, and the like. The particulates may experience sag within the invert emulsion drilling fluids, which may adversely affect the performance of the drilling fluid. As used herein, the term "sag" refers to a variation in drilling fluid density along a fluid column (e.g., when the fluid is within a wellbore) that is the result of settling of particulates within the drilling fluid. Sag generally results from the inability of the drilling fluid, under the particular conditions of the subterranean formation, to provide adequate suspension properties. Drilling fluids may exhibit sag in both static and dynamic conditions. As used herein, the term "static" refers to a complete quiescent state of the drilling fluid, and the term "dynamic" refers to any situation in which the drilling fluid is exposed to a shear stress (e.g., during drilling).

Sag may result in the formation of a bed of particulates (e.g., weighting agents) on the bottom, or low, side of a wellbore, whether the wellbore is vertical or non-vertical. In some cases, sag may adversely affect a drilling operation, leading to problems including, but not limited to, stuck drill pipe, inability to reinitiate or maintain proper circulation of the drilling fluid, disproportionate removal from a wellbore of lighter components of the drilling fluid, and the like. In some extreme cases, sag may lead to abandonment of a wellbore.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the associatively stable invert emulsions of the embodiments described herein to a downhole location.

DETAILED DESCRIPTION

The embodiments herein relate to methods of designing an invert emulsion fluid having high associative stability. Specifically, the embodiments herein relate to designing an invert emulsion having high associative stability such that the invert emulsion will resist sag during use in a subterranean operation, such as a drilling operation. The invert emulsions described in some embodiments herein comprise an oil phase (i.e., a continuous oil phase), an aqueous phase (i.e., a dispersed aqueous droplet phase), and a particulates fraction. In some embodiments, the particulates fraction may comprise sub-fractions. The term "associative stability," as used herein, refers to the degree of association within an invert emulsion of the particulates fraction, or a sub-fraction of the particulates fraction, and the aqueous phase, reflecting the ability of the emulsion to resist sag (i.e., the propensity of the aqueous phase and the particulates fraction to remain associated).

The associative stability of a particular invert emulsion may depend on internal factors specific to the emulsion itself, as well as external factors.

Internal factors that may affect the associative stability of a particular invert emulsion may include, but are not limited to, the type of oil used to form the oil phase, the type of water used to form the aqueous phase, the oil-to-water ratio, the concentration of particulates in the particulates fraction or sub-fraction, the type and concentration of any additional additives that may be included in the invert emulsion (e.g., emulsifiers, filtration control agents, etc.), and the like. External factors that may affect the associative stability of a particular invert emulsion may include, but are not limited to, temperature (e.g., the temperature of a subterranean formation or of storage conditions), pressure, static conditions, dynamic conditions (e.g., the shear stress that the invert emulsion encounters), and the like. As such, each of these parameters may be manipulated in order to improve the associative stability of a particular invert emulsion, thereby forming an associatively stable invert emulsion.

Although some embodiments described herein are illustrated by reference to drilling operations, the associatively stable invert emulsions disclosed herein may be used in any subterranean formation operation that may benefit from an invert emulsion capable of resisting sag. Such treatment operations may include, but are not limited to, a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof. In addition, the embodiments described herein may be used to design and/or monitor drilling fluids left behind casing. Furthermore, the embodiments described herein may be used in full-scale subterranean operations or pills. As used herein, the term "pill" refers to a relatively small volume of specially prepared fluid (e.g., drilling fluid) placed or circulated in a wellbore.

Moreover, the associatively stable invert emulsions described herein may be used in any non-subterranean operation that may benefit from their sag resistant properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment described herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments described herein, a method is provided comprising providing a subterranean formation having a target downhole temperature. A proposed invert emulsion treatment fluid comprising an oil phase, an aqueous phase, and a particulates fraction is provided. The particulates fraction of the proposed invert emulsion comprises a first sub-fraction comprising high-gravity particulates and a second sub-fraction comprising low-gravity particulates. In some embodiments, an initial associative stability value is calculated based on the degree of association between the aqueous phase and the particulates fraction comprising both the first sub-fraction and the second sub-fraction. In some embodiments, it may be desirable to calculate the initial associative stability based on both the first and second sub-fractions when both sub-fractions are present in the invert emulsion in a significant or non-negligible amount. Additionally, it may be desirable to calculate the initial associative stability value based on both the first and second sub-fractions, such as when, for example, a significant degree of association between the first sub-fraction and the aqueous phase is identified so as to determine whether such association is also occurring with the second sub-fraction.

In other embodiments, an initial associative stability value is calculated based on the degree of association between the aqueous phase and the particulates fraction comprising only the first sub-fraction including high-gravity particulates. Generally, when the second sub-fraction comprising low-gravity particulates is negligible or particularly slight compared to the amount of high-gravity particulates, it may be sufficient to calculate the initial associative stability value based solely on the high-gravity particulates. In other embodiments, an initial associative stability value is calculated based on the degree of association between the aqueous phase and the particulates fraction comprising only the second sub-fraction including low-gravity particulates. Generally, when the first sub-fraction comprising high-gravity particulates is negligible or particularly slight compared to the amount of low-gravity particulates, it may be sufficient to calculate the initial associative stability value based solely on the low-gravity particulates.

Based on the initial associative stability value, the proposed invert emulsion is then manipulated so as to produce an associatively stable invert emulsion having a final associative stability value in the range of a lower limit of about 50%, 52.5%, 55%, 57.5%, 60%, 62.5%, 65%, 67.5%, 70%, 72.5%, and 75% to an upper limit of about 100%, 97.5%, 95%, 92.5%, 90%, 87.5%, 85%, 82.5%, 80%, 77.5%, and 75%. The associatively stable invert emulsion is then introduced into the subterranean formation. In general, as used herein, the term "invert emulsion" will be used collectively to refer to both the proposed invert emulsion and the associatively stable invert emulsion, unless explicitly stated otherwise.

The final associative stability value, like the initial associative stability value, may be calculated based on the degree of association between the aqueous phase and the particulates fraction comprising both the first sub-fraction and the second sub-fraction, based on the degree of association between the aqueous phase and only the first sub-fraction, or based on the degree of association between the aqueous phase and the second sub-fraction.

In some embodiments, the associative stability of the invert emulsions described herein (e.g., the associative stability of the proposed invert emulsion and the associatively stable invert emulsion) may be a function of the ratio of the aqueous phase and the particulates fraction, comprising only the first sub-fraction, only the second sub-fraction, or both the first and second sub-fractions, as determined by a component mass balance computation of the oil phase, the aqueous phase, and the particulates fraction (both the first sub-fraction and the second sub-fraction) based on retort analysis, mud-weight analysis, and/or chemical analysis (titration) taken before and after static aging at a target temperature. The mass balance computation takes into account each of the oil phase, the aqueous phase, and the complete particulates fraction. However, associative stability value may take into account only the aqueous phase and the complete particulates fraction, the aqueous phase and the first sub-fraction, or the aqueous phase and the second sub-fraction.

In calculating the associative stability, chemical analysis testing may not always be necessary. In those embodiments where the aqueous phase comprises a salted aqueous base fluid (e.g., brine, seawater, saltwater, and the like) or a significant amount of salt or other additives (e.g., glycol, glycerin, and the like), chemical analysis testing may be required to determine the associative stability value. In those embodiments where the aqueous phase comprises fresh water, chemical analysis testing may not be required to determine the associative stability value. In general, a more precise associative stability value may be obtained when chemical analysis is performed. However, reliable associative stability values may be obtained without the use of chemical analysis.

The associative stability value of a particular invert emulsion may be calculated based on a percentage ratio of the ratio of the desired particulates phase to the aqueous phase as determined based on a component mass balance computation of the oil phase, the aqueous phase, the first sub-fraction fraction, and the second sub-fraction using retort analysis, mud-weight analysis, and/or chemical analysis taken before static-aging at a target temperature and at a target pressure, to the ratio of the desired particulates phase to the aqueous phase as determined based on a component mass balance computation of the oil phase, the aqueous phase, the first sub-fraction fraction, and the second sub-fraction using retort analysis, mud-weight analysis, and/or chemical analysis taken after static-aging at the target temperature and at the target pressure. The associative stability value is represented by Formula 1:

$$AS = \left( \frac{\emptyset^b_{pfrac} \div \emptyset^b_{aphase}}{\emptyset^a_{pfrac} \div \emptyset^a_{aphase}} \right) * 100\% \quad \text{(Formula 1)}$$

where AS is the associative stability value; $\emptyset_{p\ frac}^{b}$ is the component mass balance computation of the particulate fraction (either the first sub-fraction, the second sub-fraction, or the combination of the first and second sub-fraction) based on retort analysis, mud-weight analysis, and/or chemical analysis taken before static aging at a target temperature and a target pressure; $\emptyset_{a\ phase}^{b}$ is the component mass balance computation of the aqueous phase based on retort analysis, mud-weight analysis, and/or chemical analysis taken before static aging at a target temperature and a target pressure; $\emptyset_{p\ frac}^{a}$ is the component mass balance computation of the particulate fraction (either the first sub-fraction, the second sub-fraction, or the combination of the first and second sub-fractions) based on retort analysis, mud-weight analysis, and/or chemical analysis taken after static aging at a target temperature and a target pressure; and $\emptyset_{a\ phase}^{a}$ is the component mass balance computation of the aqueous phase based on retort analysis, mud-weight analysis, and/or chemical analysis taken after static aging at a target temperature and a target pressure.

Formula 1 is a universal formula for calculating the associative stability value, as described herein. That is, the formula may be used regardless of whether the chemical analysis testing is or is not performed, whether the first sub-portion of the particulates fraction is used singly to determine associative stability, whether the second sub-portion of the particulates fraction is used singly to determine associative stability, or whether the first and second sub-portions of the particulates fraction are used together to determine associative stability. One of ordinary skill in the art, with the benefit of this disclosure, will recognize the universality of Formula 1, despite the subtle input variations that are disclosed herein.

The variables for input in Formula 1 are determined based on a standard component mass balance computation of the aqueous phase, oil phase, and particulates fraction (including both the first sub-fraction and the second sub-fraction) of the invert emulsion as determined by retort analysis, mud-weight analysis, and/or chemical analysis taken before static aging and after static aging at a target temperature. The component mass balance computation takes into account these analytical tests for each of the aqueous phase, oil phase, and particulates fraction, even though the associative stability value determined by Formula 1 only includes the component mass balance computation for the aqueous phase and the complete particulates fraction, the first sub-fraction, or the second sub-fraction.

Various functions of Formula 1, as represented by Formula 2 and Formula 3, may also be used to determine the associative stability value as described in some embodiments herein. Such functions may include, but are not limited to, a power function; an exponential function; a linear function; and any combination thereof.

$$AS = f\left( \frac{\emptyset^b_{pfrac} \div \emptyset^b_{aphase}}{\emptyset^a_{pfrac} \div \emptyset^a_{aphase}} \right) * 100\% \quad \text{(Formula 2)}$$

$$AS = \left( \frac{f(\emptyset^b_{pfrac}) \div f(\emptyset^b_{aphase})}{f(\emptyset^a_{pfrac}) \div f(\emptyset^a_{aphase})} \right) * 100\% \quad \text{(Formula 3)}$$

The static aging test performed on the invert emulsions described herein in order to determine the associative stability value may be any standard static aging test. Generally, a sample of the invert emulsion is placed in a static aging cell and incubated in static conditions at a target temperature and target pressure for a period of time. After aging is complete, the invert emulsion is cooled to room temperature. A sample of the invert emulsion is then tested for retort analysis, mud-weight analysis, and/or chemical analysis both before static aging and after static aging in accordance with the embodiments disclosed herein. The invert emulsion that is tested after static aging is collected from the bottom of the static aging cell so as to ensure that any sag that may have occurred during the static aging test is accounted for in calculating the associative stability value. Generally, the portion of the invert emulsion that is tested after static aging is collected from at least the bottom 35% of the static aging cell. This portion of the invert emulsion may represent the "sagged" portion of the invert emulsion after static aging is complete. In other embodiments, the portion of the invert emulsion that is tested after static aging is collected from at least the bottom 20% of the static aging cell, or even from at least the bottom 7% of the static aging cell. In some embodiments, the static aging cell may have a capacity of 500 ml, a length of 16 cm (~6.3 in) and an inner diameter of approximately 6.3 cm (~2.5 in) and 350 ml of the invert emulsion may be static aged in the static aging cell, forming a fluid column of about 11 cm (~4.3 in). In such embodiments, the bottom 35% may be equivalent to approximately the bottom 3.9 cm (~1.5 in) of the fluid column, 20% equivalent to 2.2 cm (~0.9 in), and 7% equivalent to 0.8 cm (~0.3 in).

The target temperature at which the static aging test is performed is typically selected based on the temperature of the subterranean formation or a portion of the subterranean formation being treated with the invert emulsion. In some embodiments, the target temperatures corresponding to a subterranean formation are in the range of a lower limit of about 21° C., 35.5° C., 50° C., 64.5° C., 79° C., 93.5° C., 108° C., 122.5° C., 137° C., 151.5° C., 166° C., 180.5° C., and 195° C. to an upper limit of about 372° C., 357.5° C., 343° C., 328.5° C., 314° C., 299.5° C., 285° C., 270.5° C., 256° C., 241.5° C., 227° C., 212.5° C., 198° C., and 183.5° C. In other embodiments, the target temperature may be a different temperature that the invert emulsion is expected to become exposed to (e.g., storage temperatures).

Similar to the target temperature, the target pressure at which the static aging test is performed may be selected based on the downhole pressure in the subterranean formation that the invert emulsion is expected to encounter during a subterranean operation. In some embodiments, the target pressure may be in the range of between a lower limit of about 100 psi, 1595 psi, 3090 psi, 4585 psi, 6080 psi, 7575 psi, 9070 psi, 10565 psi, 12060 psi, 13555, and 15050 psi to an upper limit of about 30000 psi, 28505 psi, 27010 psi, 25515 psi, 24020 psi, 22525 psi, 21030 psi, 19535 psi, 18040 psi, 16545 psi, and 15050 psi.

Static aging is generally allowed to progress for at least about 16 hours, so as to mimic the static conditions that the invert emulsion may encounter in the subterranean formation. However, in those subterranean operations where static conditions are expected to be less lengthy, a lesser static aging time may be used to determine the associative stability value. Likewise, in those subterranean operations where static conditions are expected to be more lengthy, a greater static aging time may be used to determine the associative stability value. One of ordinary skill in the art, with the benefit of this disclosure, will recognize the static aging time and temperature required to determine the associative stability value as described in some embodiments herein based on the specifics of a particular subterranean formation.

The retort analysis performed on the oil phase, aqueous phase, and particulates fraction (including both the first sub-fraction and the second sub-fraction) of the invert emulsion used to determine the associative stability value after component mass balance may be any retort analysis suitable for analysis of the invert emulsions described herein. In some embodiments, the retort analysis may be performed according to the American Petroleum Institute (API) Recommended Practice for Field Testing of Oil-Based Drilling Fluid 13B-2, Sec. 8 ($4^{th}$ Ed.). Retort analysis is used to measure the volume percent of the water, oil, and particulates content of the invert emulsions described herein both before and after static aging (i.e., before and after potential sag). Retort analysis involves heating a known volume of the invert emulsion in a retort instrument so as to vaporize the liquid components. Retort instruments are available in three sizes, including 10 $cm^3$, 20 $cm^3$, and 50 $cm^3$. In some embodiments, the larger sized retort instruments may be preferred for use in performing the retort analysis described herein. The vapors then condense and are collected in a precision-graduated receiver. The volume fraction, expressed as a volume percent, of the particulates (which may be referred to as "retort solids") is calculated by subtracting the total liquid volume from the starting volume of the invert emulsion and dividing by the starting volume.

The mud-weight analysis performed on the oil phase, aqueous phase, and particulates fraction (including both the first sub-fraction and the second sub-fraction) of the invert emulsion used to determine the associative stability value after component mass balance may be any mud-weight analysis suitable for analysis of the invert emulsions described herein. In some embodiments, the mud-weight analysis may be performed according to the API Recommended Practice for Fluid Testing of Oil-Based Drilling Fluids 13B-2, Sec. 4 ($4^{th}$ Ed.). The mud-weight analysis test is performed to determine the mass per unit volume of the invert emulsion (also referred to as mud density) both before and after static aging. The mass of the invert emulsion may be expressed as grams per cubic centimeter, kilograms per cubic meter, pounds per gallon or pounds per cubic foot.

The chemical analysis (titration) test performed on the oil phase, aqueous phase, and particulates fraction (including both the first sub-fraction and the second sub-fraction) of the invert emulsion used to determine the associative stability value after component mass balance may be any chemical analysis test suitable for analysis of the invert emulsion described herein. In some embodiments, the chemical analysis may be performed according to the API Recommended Practice for Fluid Testing of Oil-Based Drilling Fluids 13B-2, Sec. 9 ($4^{th}$ Ed.). In preferred embodiments, the whole-drilling-fluid chloride test and the whole-drilling-fluid calcium test according to API 13B-2, Sec. 9, in addition to retort analysis may be used to calculate $CaCl_2$ and NaCl content in the aqueous phase, for use in determining the associative stability value. The chemical analysis test measures the volume of standard acid required to react with the alkaline materials (e.g., salts) in the invert emulsion. The alkalinity value can then be used to calculate the concentration of non-reacted "excess" alkaline materials in the invert emulsion, which may help to stabilize the emulsion and neutralize any acidic components within or that may be encountered by the invert emulsion.

The standard component mass balance computation defines the mathematical equality between the mass (density*volume) of the invert emulsion and the sum of the masses (density*corresponding volume) of its components (i.e., the oil phase, the aqueous phase, and the complete particulates fraction). The component mass balance computation assumes that masses and volumes are additive and material is neither generated nor lost from the invert emulsion. One of ordinary skill in the art, with the benefit of this disclosure, will understand how to perform the standard component mass balance computation as described herein so as to achieve the associative stability value of a particular invert emulsion.

In some embodiments, the aqueous phase of the invert emulsions described herein may comprise any aqueous base fluid (i.e., any "water") suitable for use in a subterranean operation. Suitable aqueous base fluids may include, but are not limited to, fresh water; saltwater (e.g., water containing one or more salts dissolved therein); brine (e.g., saturated saltwater); seawater; and any combination thereof. In some embodiments, the aqueous base fluids may comprise additional additives, such as glycerol. Generally, the aqueous base fluid may be from any source, provided that it does not contain components that might adversely affect the stability of an associatively stable invert emulsion as prepared according to some embodiments described herein.

In some embodiments, the oil phase of the invert emulsions described herein may comprise any oil base fluid (i.e., any "oil") suitable for use in a subterranean formation. Suitable oil base fluids may include, but are not limited to, an alkane; an olefin; an aromatic organic compound; a cyclic alkane; a paraffin; a diesel fluid; a mineral oil; a desulfurized hydrogenated kerosene; a crude oil; a synthetic oil; a petroleum distillate; a kerosene; a gas oil; a fuel oil; a low toxicity mineral oil; a polyolefin; a polydiorganosiloxane; a siloxane; an organosiloxane; an ester; and any combination thereof.

The particulates for use in the particulates fraction of the invert emulsions described herein may be of any material known in the art suitable for use in a subterranean operation. The particulates fraction of the invert emulsion may comprise a first sub-fraction comprising high-gravity particulates and a second sub-fraction comprising low-gravity particulates. The first sub-fraction alone or the combination of the first and second sub-fraction may be used to calculate the associative stability value. As used herein, the term "high-gravity particulates" refers to particulates that have a specific gravity in the range of a lower limit of about 2.7 g/cm$^3$, 2.8 g/cm$^3$, 29. g/cm$^3$, 3.0 g/cm$^3$, 3.1 g/cm$^3$, 3.2 g/cm$^3$, 3.3 g/cm$^3$, 3.4 g/cm$^3$, 3.5 g/cm$^3$, 3.6 g/cm$^3$, 3.7 g/cm$^3$, 3.8 g/cm$^3$, 3.9 g/cm$^3$, 4.0 g/cm$^3$, 4.1 g/cm$^3$, 4.2 g/cm$^3$, 4.3 g/cm$^3$, 4.4 g/cm$^3$, 4.5 g/cm$^3$, 4.6 g/cm$^3$, 4.7 g/cm$^3$, 4.8 g/cm$^3$, 4.9 g/cm$^3$, and 5.0 g/cm$^3$ to an upper limit of about 8.0 g/cm$^3$, 7.9 g/cm$^3$, 7.8 g/cm$^3$, 7.7 g/cm$^3$, 7.6 g/cm$^3$, 7.5 g/cm$^3$, 7.4 g/cm$^3$, 7.3 g/cm$^3$, 7.2 g/cm$^3$, 7.1 g/cm$^3$, 7.0 g/cm$^3$, 6.9 g/cm$^3$, 6.8 g/cm$^3$, 6.7 g/cm$^3$, 6.6 g/cm$^3$, 6.5 g/cm$^3$, 6.4 g/cm$^3$, 6.3 g/cm$^3$, 6.2 g/cm$^3$, 6.1 g/cm$^3$, 6.0 g/cm$^3$, 5.9 g/cm$^3$, 5.8 g/cm$^3$, 5.7 g/cm$^3$, 5.6 g/cm$^3$, 5.5 g/cm$^3$, 5.4 g/cm$^3$, 5.3 g/cm$^3$, 5.2 g/cm$^3$, 5.1 g/cm$^3$, and 5.0 g/cm$^3$. In some embodiments, the high-gravity particulates may be selected from the group consisting of barite; hematite; ilmenite; galena; manganese oxide; iron oxide; manganese tetroxide; magnetite; siderite; celesite; dolomite; manganese carbonate; and any combination thereof. In those embodiments where the high-gravity particulates are manganese tetroxide, the manganese tetroxide may be preferably ground.

As used herein, the term "low-gravity particulates" refers to particulates that have a specific gravity in the range of from a lower limit of the specific gravity of the oil base fluid comprising the oil phase of the invert emulsion to an upper limit of about 2.7 g/cm$^3$, and any specific gravity value therebetween. In some embodiments, the low-gravity particulates may have a specific gravity in the range of a lower limit of about 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, 1.4 g/cm$^3$, 1.5 g/cm$^3$, and 1.6 g/cm$^3$ to an upper limit of about 2.7 g/cm$^3$, 2.6 g/cm$^3$, 2.5 g/cm$^3$, 2.4 g/cm$^3$, 2.3 g/cm$^3$, 2.2 g/cm$^3$, 2.1 g/cm$^3$, 2.0 g/cm$^3$, 1.9 g/cm$^3$, 1.8 g/cm$^3$, 1.7 g/cm$^3$, and 1.6 g/cm$^3$. In some embodiments, the low-gravity particulates may include various types of drill solids and commercial clays. In some embodiments, the low-gravity particulates may be selected from the group consisting of calcium carbonate; marble; polyethylene; polypropylene; limestone; a salt (e.g., salt crystals); shale; bentonite; graphitic material; silica; kaolinitel sepiolite; hectorite; organoclay; insoluble polymeric material; calcite; and any combination thereof.

In some embodiments, the invert emulsions described herein further comprise an additive selected from the group consisting of a weighting agent; a fluid loss control agent; an emulsifier; an emulsifier activator (e.g., lime); a dispersion aid; a corrosion inhibitor; an emulsion thinner; an emulsion thickener; a viscosifying agent; a gelling agent; a surfactant; a lost circulation material; a foaming agent; a gas; a breaker; a crosslinker; a stabilizer; a mutual solvent; a reducer; a friction reducer; a clay stabilizing agent; a filtration control agent (e.g., a modified lignitic product); a scavenger; and any combination thereof.

The range of associative stability values is between about 0% to about 100%. An associative stability value of about 0% indicates a fully unstable association system. That is, the aqueous phase and the particulates fraction are not associated and the invert emulsion will not be able to resist sag. Thus, an invert emulsion having an associative stability value of 0% is not generally preferred for subterranean operations. On the other hand, an associative stability value of 100% indicates a fully stable invert emulsion. That is, the aqueous phase and the particulates fraction remain associated and the invert emulsion is very capable of resisting sag. As such, invert emulsions having an associative stability value of 100% are highly stable fluids that may be preferred for use in subterranean operations. Although invert emulsions having an associative stability value of 100% may be preferred, invert emulsions having an associative stability value of between a lower limit of about 50%, 55%, 60%, 65%, 70%, and 75% to an upper limit of about 100%, 95%, 90%, 85%, 80%, and 75% represent stable association systems that may be used in subterranean operations, referred to herein as "associatively stable invert emulsions." In some embodiments, depending on the particular subterranean operation and conditions of the formation, it may be preferred that the invert emulsion have an associative stability value of between about 80% to about 100%. In other embodiments, depending on the particular subterranean operation and conditions of the formation, it may be preferred that the invert emulsion have an associative stability value of between about 90% to about 100%.

In some embodiments, to achieve the desired associative stability value, an initial associative stability value of a proposed invert emulsion fluid is calculated based on the aqueous phase and the desired particulates fraction, comprising either the complete particulates fraction, only the first sub-fraction of high-gravity particulates, or only the second sub-fraction of low-gravity particulates. Thereafter, the proposed invert emulsion is manipulated to achieve an associatively stable invert emulsion having a final associative stability value in the range of between about 50% to about 100%. The final associative stability is determined after manipulation. In some embodiments, multiple intermediate manipulations and associative stability value determinations may be made prior to achieving the final associative stability value representing an associatively stable invert emulsion. That is, the steps of calculating the initial associative stability value and manipulating the proposed invert emulsion so as to form an associatively stable invert emulsion having an associatively stable invert emulsion in the range of between about 50% and about 100% may be repeated at least once. In this way, an invert emulsion may be optimized for a particular use and/or for a particular subterranean formation.

The proposed invert emulsions may be manipulated by adjusting the concentration, type, and/or additive components, which may be added, removed, or adjusted in concentration, in the invert emulsion so as to achieve the associatively stable invert emulsions described herein. Manipulations may include, but are not limited to, adjusting the concentration of the oil phase; adjusting the type of oil base fluid comprising the oil phase; adjusting the concentration of the aqueous phase; adjusting the type of aqueous base fluid comprising the aqueous phase; adjusting the concentration of the particulates fraction; adjusting the type of particulates in the particulates fraction; adjusting the ratio of the high-gravity particulates to the low-gravity particulates; adding one or more additives; adjusting the concentration of one or more additives; removing one or more additives; and any combination thereof.

The exemplary associatively stable invert emulsions disclosed herein may directly or indirectly affect one or more components or pieces of equipment associated with the preparation, delivery, recapture, recycling, reuse, and/or disposal of the disclosed associatively stable invert emulsions. For example, and with reference to FIG. 1, the disclosed associatively stable invert emulsions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed associatively stable invert emulsions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed associatively stable invert emulsions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed associatively stable invert emulsions may be stored, reconditioned, and/or regulated until added to the drilling fluid 122.

As mentioned above, the disclosed associatively stable invert emulsions may directly or indirectly affect the components and equipment of the drilling assembly 100. For example, the disclosed associatively stable invert emulsions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and the like. The fluid processing unit(s) 128 may further include one or more sensors, gauges, pumps, compressors, and the like used to store, monitor, regulate, and/or recondition the exemplary associatively stable invert emulsions.

The disclosed associatively stable invert emulsions may directly or indirectly affect the pump 120, which representatively includes any conduits, pipelines, trucks, tubulars, and/or pipes used to fluidically convey the associatively stable invert emulsions downhole, any pumps, compressors, or motors (e.g., topside or downhole) used to drive the associatively stable invert emulsions into motion, any valves or related joints used to regulate the pressure or flow rate of the associatively stable invert emulsions, and any sensors (i.e., pressure, temperature, flow rate, etc.), gauges, and/or combinations thereof, and the like. The disclosed associatively stable invert emulsions may also directly or indirectly affect the mixing hopper 134 and the retention pit 132 and their assorted variations.

The disclosed associatively stable invert emulsions may also directly or indirectly affect the various downhole equipment and tools that may come into contact with the associatively stable invert emulsions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed associatively stable invert emulsions may also directly or indirectly affect any downhole heat exchangers, valves and corresponding actuation devices, tool seals, packers and other wellbore isolation devices or components, and the like associated with the wellbore 116. The disclosed associatively stable invert emulsions may also directly or indirectly affect the drill bit 114, which may include, but is not limited to, roller cone bits, PDC bits, natural diamond bits, any hole openers, reamers, coring bits, etc.

While not specifically illustrated herein, the disclosed associatively stable invert emulsions may also directly or indirectly affect any transport or delivery equipment used to convey the associatively stable invert emulsions to the drilling assembly 100 such as, for example, any transport vessels, conduits, pipelines, trucks, tubulars, and/or pipes used to fluidically move the associatively stable invert emulsions from one location to another, any pumps, compressors, or motors used to drive the associatively stable invert emulsions into motion, any valves or related joints used to regulate the pressure or flow rate of the associatively stable invert emulsions, and any sensors (i.e., pressure and temperature), gauges, and/or combinations thereof, and the like.

Embodiments disclosed herein include:

A. A method comprising: providing a proposed invert emulsion formulation, wherein the proposed invert emulsion formulation comprises an oil phase, an aqueous phase, and a particulates fraction comprising a first sub-fraction and a second sub-fraction, wherein the first sub-fraction comprises high-gravity particulates and the second sub-fraction comprises low-gravity particulates; calculating an initial associative stability value of the proposed invert emulsion based on the degree of association between the aqueous phase and the particulates fraction comprising both the first sub-fraction and the second sub-fraction; manipulating the proposed invert emulsion based on the initial associative stability value so as to produce an associatively stable invert emulsion having a final associative stability value in the range of between about 50% and about 100%; and introducing the associatively stable invert emulsion into a subterranean formation.

B. A method comprising: providing a proposed invert emulsion formulation, wherein the proposed invert emulsion formulation comprises an oil phase, an aqueous phase, and a particulates fraction comprising a first sub-fraction and a second sub-fraction, wherein the first sub-fraction comprises high-gravity particulates and the second sub-fraction comprises low-gravity particulates; calculating an initial associative stability value of the proposed invert emulsion based on the degree of association between the aqueous phase and the first sub-fraction; manipulating the proposed invert emulsion based on the initial associative stability value so as to produce an associatively stable invert emulsion having a final associative stability value in the range of between about 50% and about 100%; and introducing the associatively stable invert emulsion into a subterranean formation.

C. A method comprising: providing a proposed invert emulsion formulation, wherein the proposed invert emulsion formulation comprises an oil phase, an aqueous phase, and a particulates fraction comprising a first sub-fraction and a second sub-fraction, wherein the first sub-fraction comprises high-gravity particulates and the second sub-fraction comprises low-gravity particulates; calculating an initial associative stability value of the proposed invert emulsion based on the degree of association between the aqueous phase and the second sub-fraction; manipulating the proposed invert emulsion based on the initial associative stability value so as to produce an associatively stable invert emulsion having a final associative stability value in the range of between about 50% and about 100%; and introducing the associatively stable invert emulsion into a subterranean formation.

Each of embodiments A, B, and C may have one or more of the following additional elements in any combination:

Element 1: Wherein the initial associative stability value and the final associative stability value are a percentage ratio of the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis and mud-weight analysis taken before static-aging at a target temperature and at a target pressure, to the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis and mud-weight analysis taken after static-aging at the target temperature and at the target pressure.

Element 2: Wherein the initial associative stability value and the final associative stability value are a percentage ratio of the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis, mud-weight analysis, and chemical analysis taken before static-aging at a target temperature and at a target pressure, to the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis, mud-weight analysis, and chemical analysis taken after static-aging at the target temperature and at the target pressure.

Element 3: wherein the initial associative stability value and the final associative stability value are a percentage ratio of the ratio of the first sub-fraction to the aqueous phase as determined based on a component mass balance computation of the oil phase, the aqueous phase, the first sub-fraction fraction, and the second sub-fraction using retort analysis and mud-weight analysis taken before static-aging at a target temperature and at a target pressure, to the ratio of the first sub-fraction to the aqueous phase as determined based on a component mass balance computation of the oil phase, the aqueous phase, the first sub-fraction fraction, and the second sub-fraction using retort analysis and mud-weight analysis taken after static-aging at the target temperature and at the target pressure.

Element 4: Wherein the initial associative stability value and the final associative stability value are a percentage ratio of the ratio of the first sub-fraction to the aqueous phase as determined based on a component mass balance computation of the oil phase, the aqueous phase, the first sub-fraction fraction, and the second sub-fraction using retort analysis, mud-weight analysis, and chemical analysis taken before static-aging at a target temperature and at a target pressure, to the ratio of the first sub-fraction to the aqueous phase as determined based on a component mass balance computation of the oil phase, the aqueous phase, the first sub-fraction fraction, and the second sub-fraction using retort analysis, mud-weight analysis, and chemical analysis taken after static-aging at the target temperature and at the target pressure.

Element 5: wherein the initial associative stability value and the final associative stability value are a percentage ratio of the ratio of the second sub-fraction to the aqueous phase as determined based on a component mass balance computation of the oil phase, the aqueous phase, the first sub-fraction fraction, and the second sub-fraction using retort analysis and mud-weight analysis taken before static-aging at a target temperature and at a target pressure, to the ratio of the second sub-fraction to the aqueous phase as determined based on a component mass balance computation of the oil phase, the aqueous phase, the first sub-fraction fraction, and the second sub-fraction using retort analysis and mud-weight analysis taken after static-aging at the target temperature and at the target pressure.

Element 6: wherein the initial associative stability value and the final associative stability value are a percentage ratio of the ratio of the second sub-fraction to the aqueous phase as determined based on a component mass balance computation of the oil phase, the aqueous phase, the first sub-fraction fraction, and the second sub-fraction using retort analysis, mud-weight analysis, and chemical analysis taken before static-aging at a target temperature and at a target pressure, to the ratio of the second sub-fraction to the aqueous phase as determined based on a component mass balance computation of the oil phase, the aqueous phase, the first sub-fraction fraction, and the second sub-fraction using retort analysis, mud-weight analysis, and chemical analysis taken after static-aging at the target temperature and at the target pressure.

Element 7: Wherein the step of: calculating an initial associative stability value of the proposed invert emulsion based on the degree of association between the aqueous phase and the particulates fraction comprising both the first sub-fraction and the second sub-fraction, and the step of: manipulating the proposed invert emulsion based on the initial associative stability value so as to produce an associatively stable invert emulsion having a final associative stability value in the range of between about 50% and about 100% is repeated at least once.

Element 6: Wherein the high-gravity particulates have a specific gravity in the range of between about 2.7 g/cm$^3$ and about 8.0 g/cm$^3$.

Element 7: Wherein the high-gravity particulates are selected from the group consisting of barite; hematite; ilmenite; galena; manganese oxide; iron oxide; manganese tetroxide; manganese carbonate; zinc carbonate; magnetite; siderite; celesite; dolomite; and any combination thereof.

Element 8: Wherein the low-gravity particulates have a specific gravity in the range of between about 0.4 g/cm$^3$ to about 2.7 g/cm$^3$.

Element 9: Wherein the low-gravity particulates are selected from the group consisting of calcium carbonate; marble; polyethylene; polypropylene; limestone; a salt; shale; bentonite; graphitic material; silica; kaolinitel sepiolite; hectorite; organoclay; insoluble polymeric material; calcite; and any combination thereof.

Element 10: Wherein the associatively stable invert emulsion is introduced into the subterranean formation so as to perform a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Element 11: Wherein the proposed invert emulsion further comprises an additive selected from the group consisting of a weighting agent; a fluid loss control agent; an emulsifier; an emulsifier activator; a dispersion aid; a corrosion inhibitor; an emulsion thinner; an emulsion thickener; a viscosifying agent; a gelling agent; a surfactant; a lost circulation material; a foaming agent; a gas; a breaker; a crosslinker; a stabilizer; a mutual solvent; a reducer; a friction reducer; a clay stabilizing agent; a filtration control agent; a scavenger; and any combination thereof.

By way of non-limiting example, exemplary combinations applicable to A, B, and C may include: A with 2, 7, and 10; B with 4, 7, 8, and 11; and C with 6, 9, and 10.

To facilitate a better understanding of the embodiments described herein, the following examples of preferred or representative embodiments are given. In no way should the following examples be read to limit, or to define, the scope of the embodiments disclosed herein.

EXAMPLE 1

In this example, the effect of temperature on the associative stability value for an invert emulsion prepared according to some embodiments herein was evaluated. An invert emulsion was prepared in accordance with the formulation in Table 1 below. The invert emulsion comprised an oil-to-water ratio of 80:20 and a mud-weight density of 12 pounds per gallon ("ppg").

TABLE 1

| Component | Amount |
|---|---|
| Oil Base Fluid, bbl | As required |
| Emulsifier (fatty acid derivative) | 8 ppb |
| Emulsifier Activator (Lime) | 1.5 ppb |
| Filtration Control Agent (modified lignitic product) | 2.5 ppb |
| CaCl$_2$ Brine (200K ppm) | As required |
| Low-Gravity Particulates I (fibrous amorphous material) | 5 ppb |
| Low-Gravity Particulates II (ground calcite) | 20 ppb |
| Low-Gravity Particulates III (drill solids) | 20 ppb |
| High-Gravity Particulates (barite) | As required for 12 ppg density |

TABLE 1-continued

| Component | Amount |
|---|---|
| Viscosifier (Modified fatty acid0) | 3 ppb |

The oil base fluid, CaCl$_2$ brine, and high-gravity particulates were added in an amount sufficient to obtain the desired oil-to-water ratio of 80:20 and desired mud-weight density of 12 ppg based on mass balance computations.

The invert emulsion was tested to determine its associative stability value at two temperatures: 150° C. and 250° C. to evaluate the effects of temperature on the associative stability value. First, a sample of the invert emulsion was tested using retort analysis, mud-weight analysis, and chemical analysis, followed by component mass balance computation to determine $Ø_{a\ phase}^{b}$ and $Ø_{p\ frac}^{b}$. In this example, only the high-gravity particulates were used to determine the associative stability value.

150° C. Sample: A sample of the invert emulsion was conditioned to temperature by hot-rolled at 150° C. for 16 hours and then static-aged at 150° C. and at 100 psi for 48 hours. After static-aging, a sample was collected from the bottom 7% of the mud portion in the static aging cell and tested using retort analysis, mud-weight analysis, and chemical analysis, followed by component mass balance computation to determine $Ø_{a\ phase}^{a}$ and $Ø_{p\ frac}^{a}$. The associative stability value of the 150° C. sample was then calculated using Formula 1.

250° C. Sample: A sample of the invert emulsion was conditioned to temperature by hot-rolled at 250° C. for 16 hours and then static-aged at 250° C. and at 100 psi for 48 hours. After static-aging, a sample was collected from the bottom 7% of the mud portion in the static aging cell and tested using retort analysis, mud-weight analysis, and chemical analysis, followed by component mass balance computation to determine $Ø_{a\ phase}^{a}$ and $Ø_{p\ frac}^{a}$. The associative stability value of the 250° C. sample was then calculated using Formula 1.

The results are shown in Table 2 and demonstrate that temperature influences the associative stability value of a particular invert emulsion. The associative stability value of the specific invert emulsion prepared according to this example is adversely affected by increasing temperature. That is, when exposed to higher temperatures, the associative stability value decreased.

TABLE 2

| Sample | $Ø_{aphase}^{b}$ | $Ø_{pfrac}^{b}$ | $Ø_{aphase}^{a}$ | $Ø_{pfrac}^{a}$ | Associative Stability |
|---|---|---|---|---|---|
| 150° C. | 0.17 | 0.14 | 0.26 | 0.22 | 97% |
| 250° C. | 0.17 | 0.14 | 0.31 | 0.34 | 75% |

Therefore, the embodiments herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a proposed invert emulsion formulation,
      wherein the proposed invert emulsion formulation comprises an oil phase, an aqueous phase, and a particulates fraction comprising a first sub-fraction and a second sub-fraction,
      wherein the first sub-fraction comprises high-gravity particulates and the second sub-fraction comprises low-gravity particulates;
   calculating an initial associative stability value of the proposed invert emulsion based on the degree of association between the aqueous phase and the particulates fraction comprising both the first sub-fraction and the second sub-fraction;
   manipulating the proposed invert emulsion based on the initial associative stability value so as to produce an associatively stable invert emulsion having a final associative stability value in the range of between about 50% and about 100%,
      wherein the initial associative stability value and the final associative stability value are a percentage ratio of the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis and mud-weight analysis taken before static-aging at a target temperature and at a target pressure,
      to the ratio of the particulates fraction comprising both the first sub-fraction and the second sub-fraction to the aqueous phase as determined based on a component mass balance computation of the oil phase, the aqueous phase, the first sub-fraction fraction, and the second sub-fraction using retort analysis and mud-weight analysis taken after static-aging at the target temperature and at the target pressure; and
   introducing the associatively stable invert emulsion into a subterranean formation.

2. The method of claim 1, wherein the initial associative stability value and the final associative stability value are a percentage ratio of the ratio of the particulates fraction comprising both the first sub-fraction and the second sub-fraction to the aqueous phase as determined based on the component mass balance computation of the oil phase, the aqueous phase, the first sub-fraction fraction, and the second sub-fraction using retort analysis, mud-weight analysis, and further chemical analysis taken before static-aging at the target temperature and at the target pressure,
   to the ratio of the particulates fraction comprising both the first sub-fraction and the second sub-fraction to the aqueous phase as determined based on the component mass balance computation of the oil phase, the aqueous phase, the first sub-fraction fraction, and the second sub-fraction using retort analysis, mud-weight analysis, and further chemical analysis taken after static-aging at the target temperature and at the target pressure.

3. The method of claim 1, wherein the step of: calculating an initial associative stability value of the proposed invert emulsion based on the degree of association between the aqueous phase and the particulates fraction comprising both the first sub-fraction and the second sub-fraction, and the step of: manipulating the proposed invert emulsion based on the initial associative stability value so as to produce an associatively stable invert emulsion having a final associative stability value in the range of between about 50% and about 100% is repeated at least once.

4. The method of claim 1, wherein the high-gravity particulates have a specific gravity in the range of between about 2.7 g/cm$^3$ and about 8.0 g/cm$^3$.

5. The method of claim 1, wherein the high-gravity particulates are selected from the group consisting of barite; hematite; ilmenite; galena; manganese oxide; iron oxide; manganese tetroxide; magnetite; siderite; celesite; dolomite; manganese carbonate; and any combination thereof.

6. The method of claim 1, wherein the low-gravity particulates have a specific gravity in the range of between about 0.4 g/cm$^3$ to about 2.7 g/cm$^3$.

7. The method of claim 1, wherein the low-gravity particulates are selected from the group consisting of calcium carbonate; marble; polyethylene; polypropylene; limestone; a salt; shale; bentonite; graphitic material; silica; kaolinitel sepiolite; hectorite; organoclay; insoluble polymeric material; calcite; and any combination thereof.

8. The method of claim 1, wherein the associatively stable invert emulsion is introduced into the subterranean formation so as to perform a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

9. The method of claim 1, wherein the proposed invert emulsion further comprises an additive selected from the group consisting of a weighting agent; a fluid loss control agent; an emulsifier; an emulsifier activator; a dispersion aid; a corrosion inhibitor; an emulsion thinner; an emulsion thickener; a viscosifying agent; a gelling agent; a surfactant; a lost circulation material; a foaming agent; a gas; a breaker; a crosslinker; a stabilizer; a mutual solvent; a reducer; a friction reducer; a clay stabilizing agent; a filtration control agent; a scavenger; and any combination thereof.

* * * * *